United States Patent
Simon et al.

(10) Patent No.: US 11,536,838 B2
(45) Date of Patent: Dec. 27, 2022

(54) DETECTION DEVICE FOR A MOTOR VEHICLE, DRIVER ASSISTANCE SYSTEM, MOTOR VEHICLE, AND METHOD

(71) Applicant: Valeo Schalter und Sensoren GmbH, Bietigheim-Bissingen (DE)

(72) Inventors: Jan Simon, Bietigheim-Bissingen (DE); Peter Horvath, Bietigheim-Bissingen (DE); Thomas Schuler, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 908 days.

(21) Appl. No.: 16/338,199

(22) PCT Filed: Sep. 28, 2017

(86) PCT No.: PCT/EP2017/074591
§ 371 (c)(1),
(2) Date: Mar. 29, 2019

(87) PCT Pub. No.: WO2018/060309
PCT Pub. Date: Apr. 5, 2018

(65) Prior Publication Data
US 2020/0025925 A1    Jan. 23, 2020

(30) Foreign Application Priority Data
Sep. 29, 2016   (DE) ..................... 10 2016 118 468.3

(51) Int. Cl.
*G01S 17/42*    (2006.01)
*G01S 17/93*    (2020.01)
(Continued)

(52) U.S. Cl.
CPC ............. *G01S 17/42* (2013.01); *B60W 30/08* (2013.01); *G01S 7/4816* (2013.01);
(Continued)

(58) Field of Classification Search
CPC ...... G01S 17/42; G01S 7/4816; G01S 7/4817; G01S 17/931; G01S 7/487; B60W 30/08; B60W 2554/00
(Continued)

(56) References Cited

U.S. PATENT DOCUMENTS 6,301,003 B1   10/2001  Shirai et al.
2016/0041266 A1   2/2016  Smits

FOREIGN PATENT DOCUMENTS

CN    105051488 A    11/2015
DE    102004036580 A1    3/2006
(Continued)

OTHER PUBLICATIONS

Translation of description of Tohme et al., DE102014001391, 101 pages (Year: 2022).*
(Continued)

*Primary Examiner* — Daniel L Murphy
(74) *Attorney, Agent, or Firm* — Osha Bergman Watanabe & Burton LLP

(57) ABSTRACT

The invention relates to a detection device (4) for a motor vehicle (1) for detecting a distance (x1) of an object (O1) in a surrounding region (5) of the motor vehicle (1) from the motor vehicle (1), comprising an emitting unit (8), which is designed to emit a light beam (9) and to scan the surrounding region (5) by orienting the light beam (9) along predetermined emission angles (10), and comprising a receiving unit (11) having at least two receiving elements (16), which are designed to receive a part (12) of the light beam (9) reflected on the object (O1), to detect the distance (x1) on the basis of a duration between the emission of the light beam (9) and the reception of the reflected part (12) of the light beam (9), and to detect a reception angle (13), at which the reflected part (12) of the light beam (9) from the surrounding region (Continued)

Figure 1:
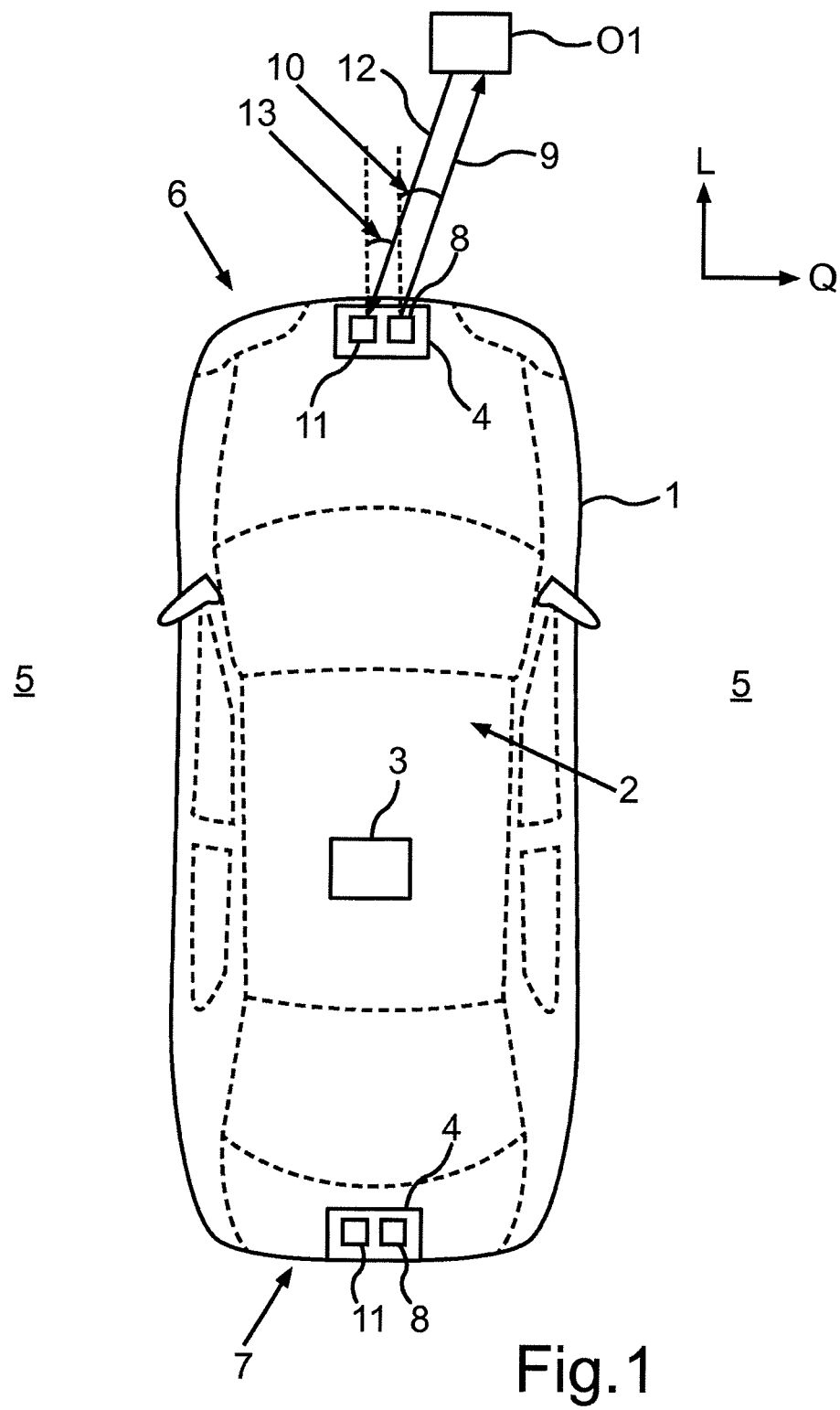

(5) is incident on the receiving unit (11), wherein the receiving unit (11) is designed to detect a deviation (17) between the emission angle (10) of the light beam (9) and the reception angle (13) of the reflected part (12) of the light beam (9) corresponding to the emission angle (10). The invention additionally relates to a driver assistance system (2), a motor vehicle (1), and a method for detecting a distance (x1) of an object (O1) in a surrounding region (5) of a motor vehicle (1).

11 Claims, 2 Drawing Sheets

(51) Int. Cl.
  *G01S 7/481* (2006.01)
  *B60W 30/08* (2012.01)
  *G01S 17/931* (2020.01)
(52) U.S. Cl.
  CPC .......... *G01S 7/4817* (2013.01); *G01S 17/931* (2020.01); *B60W 2554/00* (2020.02)
(58) Field of Classification Search
  USPC ........................................................ 356/4.01
  See application file for complete search history.

(56) References Cited

FOREIGN PATENT DOCUMENTS

| | | | |
|---|---|---|---|
| DE | 112014001391 T5 | 12/2015 | |
| JP | 2000-056018 A | 2/2000 | |
| JP | 2002-022830 A | 1/2002 | |
| JP | 3385471 B2 * | 3/2003 | ........... G01N 21/553 |
| JP | 2007-298409 A | 11/2007 | |
| JP | 2007-316016 A | 12/2007 | |
| JP | 2016-519757 A | 7/2016 | |
| WO | WO-2008054217 A1 * | 5/2008 | ............ G01C 11/06 |

OTHER PUBLICATIONS

Translation of description of Otsuki et al JP3385471, 42 pages. (Year: 2022).*
Notification of Reason for Rejection issued in corresponding Japanese Application No. 2019-516931, dated Jul. 3, 2020 (8 pages).
Notice of Preliminary Rejection in corresponding Korean Application No. 2019-7012111, dated Feb. 25, 2020 (15 pages).
International Search Report and Written Opinion issued in corresponding International Patent Application No. PCT/EP2017/074591, dated Jan. 2, 2018 (17 pages).
Search Report issued in corresponding German Patent Application No. 10 2016 118 468.3, dated Jun. 1, 2017 (7 pages).
First Office Action in corresponding Chinese Application No. 201780067018.5, dated Sep. 1, 2022 (23 pages).

* cited by examiner

DETECTION DEVICE FOR A MOTOR VEHICLE, DRIVER ASSISTANCE SYSTEM, MOTOR VEHICLE, AND METHOD

The invention relates to a detection device for a motor vehicle for detecting a distance of an object in a surrounding region of the motor vehicle from the motor vehicle, comprising an emitting unit, which is designed to emit a light beam and scan the surrounding region by orienting the light beam along predetermined emission angles, and comprising a receiving unit having at least two receiving elements, which are designed to receive a part of the light beam reflected on the object, to detect the distance on the basis of a duration between the emission of the light beam and the reception of the reflected part of the light beam, and to detect a reception angle at which the reflected part of the light beam from the surrounding region is incident on the receiving unit. The invention moreover relates to a driver assistance system, a motor vehicle, and a method for detecting a distance of an object in a surrounding region of a motor vehicle from the motor vehicle.

In the present case, the interest is directed to an optical detection device for a motor vehicle, in particular a laser scanner. A surrounding region of the motor vehicle can be monitored by means of the detection device. In this case, objects in the surrounding region can be detected and items of information about the detected objects, for example, a relative position of the objects in relation to the motor vehicle, can be provided to a driver assistance system of the motor vehicle. The driver assistance system can, for example, initiate measures to avoid a collision of the motor vehicle with the object based on these items of information, for example, automatically brake the motor vehicle before the collision.

In laser scanners according to the prior art, a light beam, for example, a laser beam, is typically emitted into the surrounding region and the surrounding region is scanned by changing an emission angle and/or an emission direction along which the light beam is oriented. As soon as the light beam is incident on an object in the surrounding region, the light beam is ideally reflected on the object back to the laser scanner, which can determine a distance of the object in relation to the motor vehicle on the basis of a runtime of the light beam and/or a duration between the emission of the light beam and the reception of the reflected part of the light beam. Knowing the emission angle upon the emission of the light beam, moreover an orientation and/or a direction of the object in relation to the motor vehicle can be determined. The relative location of the object in relation to the motor vehicle can then be determined from the orientation and the distance.

However, problems result if the light beam is scattered on the object, deflected by the scattering onto another object in the surrounding region, the part of the light beam reflected on this other object returns to the laser scanner and is detected by the laser scanner. An indirect signal path of the light beam, which typically cannot be recognized by the laser scanner, results from the deflection of the light beam on the other object and the reflection of the light beam on the other object. Due to the indirect signal path, the runtime of the light beam lengthens, so that the distance of the object determined on the basis of this longer runtime is incorrect and does not reflect the actual distance of the object from the motor vehicle. The driver assistance system then cannot be reliably operated due to this incorrect distance measurement.

It is an object of the present invention to provide a solution for how distances of objects in a surrounding region of a motor vehicle can be determined particularly accurately, and thus the surrounding region can be monitored particularly reliably.

This object is achieved according to the invention by a detection device, a driver assistance system, a motor vehicle, and a method according to the respective independent claims. Advantageous embodiments of the invention are the subject matter of the dependent claims, the description, and the figures.

In one embodiment of a detection device according to the invention for a motor vehicle for detecting a distance of an object in a surrounding region of the motor vehicle from the motor vehicle, it has an emitting unit, which is designed to emit a light beam and scan the surrounding region by orienting the light beam along predetermined emission angles. Moreover, the detection device according to this embodiment has a receiving unit having at least two receiving elements, which are designed to receive a part of the light beam reflected on the object, to detect the distance on the basis of a duration between the emission of the light beam and the reception of the reflected part of the light beam, and to detect a reception angle at which the reflected part of the light beam from the surrounding region is incident on the receiving unit. In particular, the receiving unit is designed to detect a deviation between the emission angle of the light beam and the reception angle of the reflected part of the light beam corresponding to the emission angle.

A detection device according to the invention for a motor vehicle for detecting a distance of an object in a surrounding region of the motor vehicle from the motor vehicle preferably has an emitting unit which is designed to emit a light beam and to scan the surrounding region by orienting the light beam along predetermined emission angles. Moreover, the detection device comprises a receiving unit having at least two receiving elements which are designed to receive a part of the light beam reflected on the object, to detect the distance on the basis of a duration between the emission of the light beam and the reception of the reflected part of the light beam, and to detect a reception angle at which the reflected part of the light beam from the surrounding region is incident on the receiving unit. In addition, the receiving unit is designed to detect a deviation between the emission angle of the light beam and the reception angle of the reflected part of the light beam corresponding to the emission angle.

The detection device, which is designed in particular as a LIDAR system (LIDAR: "Light Detection and Ranging") and/or as a laser scanner, can be arranged on a motor vehicle to monitor the surrounding region of the motor vehicle. In this case, the detection device can scan or sample the surrounding region by means of a light beam, in particular a laser beam, and thus recognize objects in the surrounding region. For this purpose, the emitting unit of the detection device in particular has an emitting element for emitting the light beam. The one emitting element can have in this case at least one light source in the form of a laser diode or a light-emitting diode or LED.

To scan the surrounding region, the light beam is emitted successively or sequentially along different emission directions. In other words, this means that the emission angle at which the light beam is emitted into the surrounding region is changed step-by-step. During a first measurement or at a first measuring time, the light beam is oriented along a first emission direction, during a subsequent second measurement or at a second subsequent measuring time, the light beam is oriented along a second emission direction, etc. The emission angle can be specified in this case as an angle by which the emission direction deviates, horizontally and/or vertically, from a predetermined direction, for example, a vehicle longitudinal direction.

To set the emission angle of the light beam, the emitting unit preferably has a deflection element, which is designed to deflect the light beam emitted by the emission element along a horizontal and/or vertical direction to provide the different emission angles. The deflection element can be, for example, a pivotable or rotatable mirror, the orientation of which can be changed step-by-step, so that the light beam emitted onto the mirror is deflected along an emission direction corresponding to the orientation of the mirror into the surrounding region. The surrounding region can be scanned line-by-line or column-by-column by the horizontal and vertical deflection of the light beam by means of the deflection element. In this case, the emitting unit is an angle-resolving emitting unit. This means that the emission angle at which the light beam is emitted during a specific measurement or at a specific measuring time is known. The emission angle has in this case in particular a first horizontal component and a second vertical component. To detect the emission angle, the emitting unit can determine, for example, the present orientation of the deflection element, in particular a horizontal deflection and a vertical deflection of the deflection element.

If an object is located in the surrounding region of the motor vehicle in a direction in relation to the motor vehicle which corresponds to the present emission direction of the light beam, the light beam emitted along this emission direction is thus reflected on the object. If a part of the light beam is reflected back to the receiving unit, the receiving unit can detect the light beam. On the basis of a runtime of the emitted light beam and the reflected part of the light beam, i.e., on the basis of a duration between the emission of the light beam and the reception of the reflected part of the light beam, the distance of the object from the motor vehicle can be detected.

In this case, not only the emitting unit is designed as angle-resolving, but rather additionally the receiving unit. This means that the receiving unit is designed to detect the reception angle at which the reflected part of the light beam from the surrounding region is incident on the receiving unit. The reception angle is in this case in particular an angle between a reception direction, from which the reflected part of the light beam is incident on the receiving unit, and the predetermined direction. In this case, a vertical and/or a horizontal component of the reception angle can be determined by the receiving unit. Therefore, for every measurement, both the emission angle, at which the light beam was emitted into the surrounding region, and also the reception angle, at which the reflected part of this light beam was received from the surrounding region, are known. For every emission angle, the reception angle corresponding to this emission angle can therefore be determined.

The receiving unit is designed in this case as angle-resolving by means of the at least two receiving elements. The receiving elements can be designed, for example, as light-sensitive sensor elements, wherein one reception angle is associated with each receiving element. The at least two receiving elements can be arranged in at least one line to detect the horizontal component of the reception angle and/or in at least one column to detect the vertical component of the reception angle. The receiving unit is designed to determine the reception angle on the basis of the receiving element detecting the reflected light beam. This means that the reflected light beam is incident essentially on one of the receiving elements of the receiving unit. The associated reception angle can then be determined on the basis of this presently detecting receiving element.

The design of the receiving unit as an angle-resolving receiving unit is based on the finding that the distance of the object can only be correctly detected if the emitted light beam is reflected back directly to the receiving unit again. The distance can thus only be detected correctly on the basis of a light beam having a direct signal path. By means of the angle-resolving receiving unit, all the reflected parts of light beams are thus advantageously able to be identified which do not return back to the receiving unit on a direct signal path. This can occur, for example, if the light beam is not reflected directly on the object, but rather is scattered and is deflected onto another object and is reflected on this other object. The duration between the emission of the light beam and the reception of the reflected part of the light beam lengthens due to this indirect signal path, which results in an error in the distance measurement. These indirect signal paths can be recognized and taken into consideration by means of the detection device having the angle-resolving emitting unit and the angle-resolving receiving unit, and incorrect distance measurements can thus be avoided. The detection device is thus designed particularly reliably.

In addition, it is provided that the receiving unit is designed to detect a deviation between the emission angle of the light beam and the reception angle of the reflected part of the light beam corresponding to the emission angle. During each measurement which comprises the emission of the light beam and the reception of the reflected part of the light beam, the emission angle of the light beam and the reception angle corresponding to the emission angle are detected. The emission angle is detected in this case on the part of the emitting unit, for example, via the present orientation or alignment of the deflection unit. The reception angle is detected on the part of the receiving unit. The reception angle is compared to the corresponding emission angle by determining the deviation, for example, as an angle between the emission direction and the reception direction. On the basis of a value of the deviation, the detected signal of the LIDAR system or a measurement of the laser scanner, respectively, can be checked for plausibility in a particularly simple manner.

The receiving unit is designed in particular to evaluate as invalid a measurement having the emission of the light beam along a specific emission angle and the reception of the reflected part of the light beam emitted at this emission angle if the deviation exceeds a predetermined threshold value for the deviation. Thus, if the emission direction and the receiving unit do not correspond and the angle between the emission direction and the receiving unit is outside a predetermined angle range, the measurement is evaluated as invalid and the distance determined in this measurement on the basis of the runtime is discarded. It is thus possible to prevent incorrect items of distance information from being provided to the driver assistance system. For example, in the case of an invalid measurement, a warning signal can be output to a driver of the motor vehicle, by which the driver is notified that an object is located in the surrounding region, but its distance cannot be accurately detected.

It can also be provided that the receiving unit is designed in dependence on the deviation to determine a probability for a plausibility of the measurement, to activate the emitting unit to emit the laser beam again at the emission angle corresponding to this measurement if the probability falls below a predetermined limiting value, and to determine the deviation between the emission angle and the reception angle for the renewed measurement. Plausibility of the detected distance is thus evaluated in dependence on the value or a dimension of the deviation. The greater the deviation, the more improbable it is that the reflected light beam originates from the direct reflection on the object. If the probability falls below the predetermined limiting value, for example, the measurement can thus be repeated at this emission angle and the emission angle and the reception angle can be compared again. The measurement is only evaluated as invalid if the deviation between the emission angle and the reception angle again exceeds the predetermined threshold value after the repeated measurement. Therefore, objects in the surrounding region can be reliably detected and the actual locations thereof in relation to the motor vehicle can be reliably determined by means of the detection device.

It can be provided in this case that an aperture angle of a detection region of the detection device oriented along a horizontal direction is greater than an aperture angle of the detection region oriented along a vertical direction. The horizontal aperture angle describes an angle range of the detection region in a horizontal plane spanned, for example, by the vehicle longitudinal direction and a vehicle transverse direction. The vertical aperture angle describes an angle range in a vertical plane standing perpendicularly to the horizontal plane, which is spanned, for example, by the vehicle longitudinal direction and a vehicle vertical direction. The detection region describes in this case in particular the region of the surrounding region into which the light beam is emitted by the emitting unit and from which the reflected part of the light beam is received by the receiving unit. Due to the larger horizontal aperture angle in comparison to the vertical aperture angle, the detection region is widened in the horizontal direction and narrowed in the vertical direction. Due to the narrowing of the detection region in the vertical direction, ground reflections, i.e., reflections of the emitted light beam on a roadway for the motor vehicle, can advantageously be prevented or at least reduced.

The receiving unit preferably has a matrix arrangement of receiving elements in which the receiving elements for detecting a horizontal and a vertical component of the reception angle are arranged in lines and columns. On the receiver side, a receiving matrix having a grid-type arrangement of receiving elements is thus provided. One reception angle can be associated with each receiving element in this case. The matrix arrangement is designed to determine the reception angle on the basis of the receiving element detecting the reflected light beam in the matrix arrangement. This means that the reflected light beam is incident essentially on one of the receiving elements of the matrix arrangement. The associated reception angle can then be determined on the basis of this presently detecting receiving element. In this case, the vertical component of the reception angle can be determined by the receiving element on the basis of a row in which the receiving element is arranged and the horizontal component of the reception angle can be determined on the basis of a column in which the receiving element is arranged. In particular, the matrix arrangement of the receiving unit has 1500 columns and 200 rows having receiving elements. A larger horizontal aperture angle of the detection region of the detection device is thus provided in comparison to the vertical aperture angle.

The emitting unit and/or the receiving unit preferably has an angle resolution of 0.1° along the horizontal direction and/or the vertical direction. In an emitting unit having an angle resolution of 0.1°, this means that the emitting unit is designed in each measurement to change the emission angle in the horizontal direction and/or vertical direction by 0.1° in comparison to the preceding measurement. In a receiving unit having an angle resolution of 0.1°, this means that two adjacent receiving elements of the receiving matrix can differentiate two reflected parts of light beams, the reception directions of which have an angle of 0.1° in relation to one another. With a resolution of 0.1° in the horizontal and vertical directions and with 1500 receiving elements per line and 200 receiving elements per column, the detection region thus has a horizontal aperture angle of 150° and a vertical aperture angle of 20°. The reception angle can be determined with a particularly high accuracy in this detection region.

The invention additionally relates to a driver assistance system for a motor vehicle for monitoring a surrounding region of the motor vehicle using at least one detection device.

For example, at least semiautonomous driving of the motor vehicle can be enabled by the detection device, which can supply items of information about a location of the object with respect to the motor vehicle. For example, the motor vehicle can be automatically braked if it has been detected by the detection device that the distance of the object from the motor vehicle falls below a predetermined distance threshold value.

A motor vehicle according to the invention comprises a driver assistance system according to the invention. The motor vehicle is designed in particular as a passenger vehicle.

The invention also relates to a method for detecting a distance of an object in a surrounding region of a motor vehicle from the motor vehicle. According to one embodiment of the method, a light beam is emitted by means of an emitting unit and the surrounding region is scanned by orienting the light beam along predetermined emission angles. A part of the light beam reflected on the object can be received by at least two receiving elements of a receiving unit, the distance can be detected on the basis of a duration between the emission of the light beam and the reception of the reflected part of the light beam, and a reception angle, at which the reflected part of the light beam is incident from the surrounding region on the receiving unit, can be detected. In particular, a deviation between the emission angle of the light beam and the reception angle of the reflected part of the light beam corresponding to the emission angle is detected by the receiving unit.

In the method, a light beam is preferably emitted by an emitting unit and the surrounding region is scanned by orienting the light beam along predetermined emission angles. A part of the light beam reflected on the object is received by at least two receiving elements of a receiving unit, the distance is detected on the basis of a duration between the emission of the light beam and the reception of the reflected part of the light beam, and a reception angle, at which the reflected part of the light beam from the surrounding region is incident on the receiving unit, is detected. In addition, a deviation between the emission angle of the light beam and the reception angle of the reflected part of the light beam corresponding to the emission angle is detected by the receiving unit.

Specifications "in front", "behind", "vertically", "horizontally", etc., specify position and orientation given with intended use and intended arrangement of the detection device on the motor vehicle and with an observer standing in front of the motor vehicle and looking along a vehicle longitudinal direction (L) of the motor vehicle.

Further features of the invention result from the claims, the figures, and the description of the figures. The features and combinations of features mentioned above in the description, and also the features mentioned hereafter in the description of the figures and/or solely shown in the figures are usable not only in the respective specified combination, but rather also in other combinations or alone, without leaving the scope of the invention. Therefore, embodiments are also to be considered to be comprised and disclosed by the invention which are not explicitly shown in the figures and explained, but originate and can be produced from the explained embodiments by separate combinations of features. Embodiments and combinations of features are also to be considered to be disclosed which therefore do not have all features of an originally formulated independent claim. In addition, embodiments and combinations of features are to be considered to be disclosed, in particular by the above-described embodiments, which go beyond or deviate from the combinations of features represented by the references in the claims.

The invention will be explained in greater detail on the basis of preferred exemplary embodiments and with reference to the appended drawings.

Figure 2:
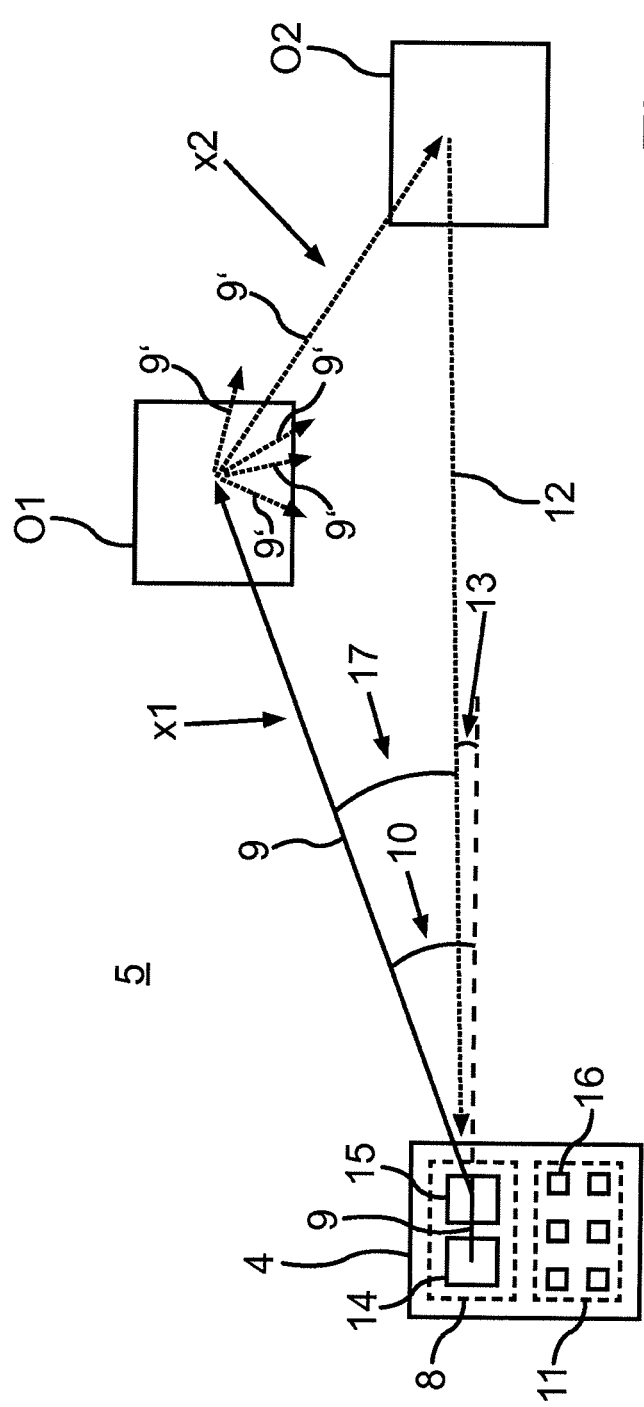

In the figures:

FIG. 1 shows a schematic illustration of an embodiment of a motor vehicle according to the invention; and FIG. 2 shows a schematic illustration of an embodiment of a detection device according to the invention during the detection of a distance to an object.

In the figures, identical and functionally-identical elements are provided with identical reference signs.

FIG. 1 shows a motor vehicle 1, which is designed in the present case as a passenger vehicle. The motor vehicle 1 comprises a driver assistance system 2, which is designed to assist a driver of the motor vehicle 1 when driving the motor vehicle 1. The driver assistance system 2 can be designed, for example, to provide at least semiautonomous driving for the motor vehicle 1. For this purpose, a control unit 3 of the driver assistance system 2 can engage, for example, in a drivetrain and a braking system of the motor vehicle 1. The driver assistance system 2 additionally has at least one detection device 4, which is designed to monitor a surrounding region 5 of the motor vehicle 1. In the present case, the motor vehicle 1 has two detection devices 4, wherein a first detection device 4 is arranged at a front region 6 of the motor vehicle 1 and is used to monitor the surrounding region 5 in front of the motor vehicle 1, and a second monitoring device 4 is arranged at a rear region 7 of the motor vehicle 1 and is used to monitor the surrounding region 5 behind the motor vehicle 1. The detection device 4, which is designed in particular as a LIDAR system and/or as a laser scanner, is designed to determine a distance and an orientation of an object O1 located in the surrounding region 5 in relation to the motor vehicle 1. The distance and the orientation of the object O1, i.e., a relative location of the object O1 in relation to the motor vehicle 1, can be provided to the driver assistance system 2, which can automatically brake the motor vehicle 1, for example, if the distance falls below a predetermined distance threshold value.

To detect the distance and the orientation, the detection device 4 has an emitting unit 8, which is designed to orient a light beam 9 in succession along different emission angles 10 and emit it into the surrounding region 5. A receiving unit 11 of the detection device 4 is designed to receive a part 12 of the light beam 9 reflected on the object O1 again. On the basis of a duration between the emission of the light beam 9 and the reception of the reflected part 12 of the light beam 9, i.e., on the basis of a runtime of the light beam 9, the receiving unit 11 can detect the distance between the object O1 and the motor vehicle 1. Moreover, the receiving unit 11 is designed to detect a reception angle 13, at which the reflected part 12 from the surrounding region 5 is incident on the receiving unit 11. According to FIG. 1, horizontal components of the emission angle 10 and the reception angle 13 are shown in a horizontal plane spanned by a vehicle longitudinal direction L and a vehicle transverse direction Q. The horizontal component of the emission angle 10 and also a vertical component (not shown here) of the emission angle 10 in a plane spanned by the vehicle longitudinal direction L and a vehicle vertical direction can be detected by the emitting unit 8. The horizontal component of the reception angle 13 and a vertical component (not shown here) of the reception angle 13 can be detected by the receiving unit 11. This means that the emitting unit 8 and the receiving unit 11 enable an angle resolution of the light beam 9 and the reflected part 12 of the light beam 9.

In FIG. 2, the detection device 4 having the emitting unit 8 and the receiving unit 11 is shown during the detection of the distance x1 of the object O1. The emitting unit 8 has an emitting element 14, which is designed to emit the light beam 9 onto a deflection element 15 of the emitting unit 8. The emitting element 14 can have, for example, at least one laser diode. The deflection element 15 can deflect the light beam 9 and thus orient it along different emission angles 10. The deflection element 15 can be designed, for example, as a movable mirror, which can be deflected in the horizontal direction along the vehicle transverse axis Q and in the vertical direction along the vehicle vertical axis. In this case, the present emission angle 10, at which the light beam 9 is emitted into the surrounding region 5, is known by way of the present orientation of the deflection element 15.

The light beam 9 is incident here on the object O1, which has a first distance x1 from the detection device 4. In this case, the light beam 9 is scattered on the object O1 and the scattered parts 9' of the light beam 9 are oriented in different directions in the surrounding region 5. One of the scattered parts 9' is incident here on a further object O2 in the surrounding region 5 of the motor vehicle 1, which has a distance x2 from the object O1, and is reflected thereon. The part 12 of the scattered part 9' of the light beam 9 reflected on the object O2 is incident in this case on the receiving unit 11. If the receiving unit 11 were now to detect the distance x1 of the object O1 on the basis of the runtime of the light beam 9, inter alia, the distance x2 of the further object O2 from the object O1 would thus incorrectly be taken into consideration in addition. The distance information determined on the basis of the runtime of the light beam 9 would thus be incorrect.

To prevent such incorrect distance measurements, the receiving unit 11 additionally detects the reception angle 13 of the reflected part 12 of the light beam 9. If the light beam 9 is reflected directly on the object O1, the emission angle 10 and the reception angle 13 are thus approximately equal. The emission angle 10 and the reception angle 13 deviate from one another here, which can be detected by the receiving unit 11. On the basis of a deviation 17 between the emission angle 10 and the reception angle 13, the receiving unit 11 can therefore detect that the light beam 9 was not reflected on a direct path back to the receiving unit 11. A measurement carried out by the detection device 4, which comprises the emission of the light beam 9 and the reception of the reflected part 12 of the light beam 9 and in which the deviation 17 falls below a predetermined threshold value, can thus be evaluated as invalid and/or the value of the distance determined in this measurement can be discarded. The measurement can also be checked for plausibility on the basis of a dimension of the deviation. For example, for this purpose a probability for the correct determination of the distance can be determined on the basis of the dimension of the deviation and if necessary, the measurement can be repeated or evaluated as invalid.

The receiving unit 11 has a plurality of receiving elements 16 and/or light-sensitive detector elements, which are arranged in a matrix, to detect the reception angle 13. In this case, the matrix arrangement can have, for example, 200 rows each having 1500 receiving elements 16. The reception angle 13 can therefore be determined on the basis of the receiving element 16 detecting the reflected part 12. By means of the matrix arrangement of the receiving elements 16, an angle range of a detection region of the receiving unit 11 of 150° can be covered in the horizontal direction and an angle range of the detection region of 20° can be covered in the vertical direction. The receiving unit 11 can have, for example, an angle resolution of 0.1° in the horizontal direction and in the vertical direction.

The invention claimed is:

1. A detection device for a motor vehicle for detecting a distance of an object in a surrounding region of the motor vehicle from the motor vehicle, the detection device comprising:
   an emitting unit that emits a light beam and scans the surrounding region by orienting the light beam along predetermined emission angles; and
   a receiving unit having at least two receiving elements that receives a part of the light beam reflected on the object,
      detects the distance on the basis of a duration between the emission of the light beam and the reception of the reflected part of the light beam,
      detects a reception angle, at which the reflected part of the light beam from the surrounding region is incident on the receiving unit, wherein the reception angle corresponds to an emission angle of the predetermined emission angles of the light beam,
      detects a deviation between the emission angle of the light beam and the reception angle of the reflected part of the light beam corresponding to the emission angle,
      determines a probability for a plausibility of detecting the distance on the basis of said duration, and
      activates, in response to the probability being less than a predetermined limiting value, the emitting unit to emit the light beam again at the emission angle corresponding to the reception angle.

2. The detection device according to claim 1, wherein the receiving unit evaluates as invalid a measurement having the emission of the light beam along a specific emission angle and the reception of the reflected part of the light beam emitted at this emission angle if the deviation exceeds a predetermined threshold value for the deviation.

3. The detection device according to claim 1, wherein the emitting unit has an emitting element for emitting the light beam and a deflection element, which is designed to deflect the light beam emitted by the emitting element along a horizontal and/or vertical direction to provide the emission angles.

4. The detection device according to claim 1, wherein an aperture angle oriented along a horizontal direction of a detection region of the detection device is greater than an aperture angle of the detection region oriented along a vertical direction.

5. The detection device according to claim 1, wherein the receiving unit has a matrix arrangement of receiving elements, in which the receiving elements are arranged in lines and columns to detect a horizontal and a vertical component of the receiving angle.

6. The detection device according to claim 5, wherein the matrix arrangement of the receiving unit has 1500 columns and 200 rows having receiving elements.

7. The detection device according to claim 1, wherein the emitting unit and/or the receiving unit has an angle resolution of 0.1° along the horizontal direction and/or the vertical direction.

8. The detection device according to claim 1, wherein the detection device is a laser scanner.

9. A driver assistance system for a motor vehicle for monitoring a surrounding region of the motor vehicle comprising a detection device according to claim 1.

10. A motor vehicle comprising a driver assistance system according to claim 9.

11. A method for detecting a distance of an object in a surrounding region of a motor vehicle from the motor vehicle, the method comprising:
   emitting a light beam by an emitting unit; and
   scanning the surrounding region by orienting the light beam along predetermined emission angles;
   receiving a part of the light beam reflected on the object by at least two receiving elements of a receiving unit;
   detecting the distance on the basis of a duration between the emission of the light beam and the reception of the reflected part of the light beam;
      detecting a reception angle at which the reflected part of the light beam is incident from the surrounding region on the receiving unit, wherein the reception angle corresponds to an emission angle of the predetermined emission angles of the light beam;
   detecting a deviation between the emission angle of the light beam and the reception angle of the reflected part of the light beam corresponding to the emission angle, by the receiving unit;
   determining a probability for a plausibility of detecting the distance on the basis of said duration; and
   activating, in response to the probability being less than a predetermined limiting value, the emitting unit to emit the light beam again at the emission angle corresponding to the reception angle.

* * * * *